US012613487B2

(12) United States Patent
Uematsu et al.

(10) Patent No.: US 12,613,487 B2
(45) Date of Patent: Apr. 28, 2026

(54) IMAGE FORMING APPARATUS AND ELECTRONIC EQUIPMENT

(71) Applicant: SEIKO EPSON CORPORATION, Tokyo (JP)

(72) Inventors: Hidekazu Uematsu, Fujimi-machi (JP); Toru Matsuyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 18/617,666

(22) Filed: Mar. 27, 2024

(65) Prior Publication Data

US 2024/0329586 A1 Oct. 3, 2024

(30) Foreign Application Priority Data

Mar. 29, 2023 (JP) ................................ 2023-053914

(51) Int. Cl.
*G03G 15/00* (2006.01)

(52) U.S. Cl.
CPC ......... *G03G 15/55* (2013.01); *G03G 15/5016* (2013.01)

(58) Field of Classification Search
CPC ........................... G03G 15/55; G03G 15/5016
See application file for complete search history.

(56) References Cited

U.S. PATENT DOCUMENTS 8,526,033 B2* 9/2013 Kim ...................... G06F 3/1288 358/1.15
2002/0089554 A1* 7/2002 Gompertz .............. B41J 29/393 347/5
2006/0150527 A1* 7/2006 Ohara ................... C01B 33/183 51/308
2008/0030362 A1* 2/2008 Huang ................ H04L 43/0817 709/224
2008/0158882 A1* 7/2008 Wang ................ G02F 1/133603 362/373
2009/0121237 A1* 5/2009 Murofushi ............. H10H 29/14 438/34
2009/0300640 A1* 12/2009 Akitomi ................ G06F 9/5077 710/100
2015/0270493 A1* 9/2015 Nishide .................. H05B 45/60 257/40
2016/0316072 A1* 10/2016 Mori .................... H04N 1/0049
2017/0123954 A1* 5/2017 Shih ..................... G06F 11/3034
2019/0319015 A1* 10/2019 Schuele .............. H01L 25/0753
2020/0314249 A1* 10/2020 Ikeda ................... H04N 1/0001
2021/0316555 A1* 10/2021 Chick .................. B41J 2/17566

FOREIGN PATENT DOCUMENTS

JP 2019-043037 A 3/2019
JP 2020-160120 A 10/2020

* cited by examiner

*Primary Examiner* — David H Banh
(74) *Attorney, Agent, or Firm* — Spencer Fane LLP

(57) ABSTRACT

An image forming apparatus includes an image forming unit that forms an image on a medium; a transport unit that transports the medium; and a light emission unit that indicates status of either one, or both, of the image forming unit and the transport unit by using a plurality of light sources including a first light source, a second light source, and a third light source, wherein the light emission unit is configured to perform light emission based on a first light emission mode in which the first light source and the second light source are on at a same time and perform light emission based on a second light emission mode in which the first light source and the third light source are on at a same time.

10 Claims, 8 Drawing Sheets

FIG. 6

| | OPERATION MODE |
|---|---|
| MD1 | NORMAL OPERATION MODE |
| MD2 | ENERGY-SAVING OPERATION MODE |

FIG. 7

| | | LIGHT EMISSION MODE |
|---|---|---|
| MM | | MULTI-COLOR LIGHT EMISSION MODE |
| | MM1 | RED-AND-GREEN TWO-COLOR LIGHT EMISSION MODE |
| | MM2 | RED-AND-BLUE TWO-COLOR LIGHT EMISSION MODE |
| MN | | MONO-COLOR LIGHT EMISSION MODE |
| | MN1 | RED LIGHT EMISSION MODE |
| | MN2 | GREEN LIGHT EMISSION MODE |
| | MN3 | BLUE LIGHT EMISSION MODE |

FIG. 8

| | LIGHTING MODE |
|---|---|
| MT1 | LONG-CYCLE BLINKING MODE |
| MT2 | SHORT-CYCLE BLINKING MODE |
| MT3 | ALWAYS-LIGHT-ON MODE |

IMAGE FORMING APPARATUS AND ELECTRONIC EQUIPMENT

The present application is based on, and claims priority from JP Application Serial Number 2023-053914, filed Mar. 29, 2023, the disclosure of which is hereby incorporated by reference herein in its entirety.

BACKGROUND

1. Technical Field

The present disclosure relates to an image forming apparatus and electronic equipment.

2. Related Art

Electronic equipment that includes a processing unit that performs predetermined processing and a light emission unit that indicates information by using a light source is widely known. For example, JP-A-2019-043037 discloses, as electronic equipment, an image forming apparatus that includes an image forming unit that performs print processing of forming an image on a medium by applying a colorant onto the medium and a light emission unit that indicates information by using a light source.

However, when a light source is provided in electronic equipment and information is indicated by the light source as in related art, there is a possibility that a user who has color vision deficiency is unable to recognize the information indicated by the light source. For this reason, in related art, there is a room for improvement regarding SDGs Goal 10: "Reduce inequality within and among countries" among SDGs, that is, seventeen sustainable development goals that were adopted at the United Nations General Assembly on Sep. 25, 2015.

SUMMARY

An image forming apparatus according to a certain aspect of the present disclosure includes: an image forming unit that forms an image on a medium by applying a colorant onto the medium; a transport unit that transports the medium; and a light emission unit that indicates status of either one, or both, of the image forming unit and the transport unit by using a plurality of light sources including a first light source that emits light having a first wavelength, a second light source that emits light having a second wavelength, and a third light source that emits light having a third wavelength, wherein the light emission unit is configured to perform light emission based on a first light emission mode in which the first light source and the second light source are on at a same time and perform light emission based on a second light emission mode in which the first light source and the third light source are on at a same time.

Electronic equipment according to a certain aspect of the present disclosure includes: a processing unit that performs predetermined processing; and a light emission unit that indicates status of the processing unit by using a plurality of light sources including a first light source that emits light having a first wavelength, a second light source that emits light having a second wavelength, and a third light source that emits light having a third wavelength, wherein the light emission unit is configured to perform light emission based on a first light emission mode in which the first light source and the second light source are on at a same time and perform light emission based on a second light emission mode in which the first light source and the third light source are on at a same time.

BRIEF DESCRIPTION OF THE DRAWINGS

FIG. 6 is a diagram for explaining an example of operation modes.

FIG. 7 is a diagram for explaining an example of light emission modes.

FIG. 8 is a diagram for explaining an example of lighting modes.

DESCRIPTION OF EMBODIMENTS

Figure 1:
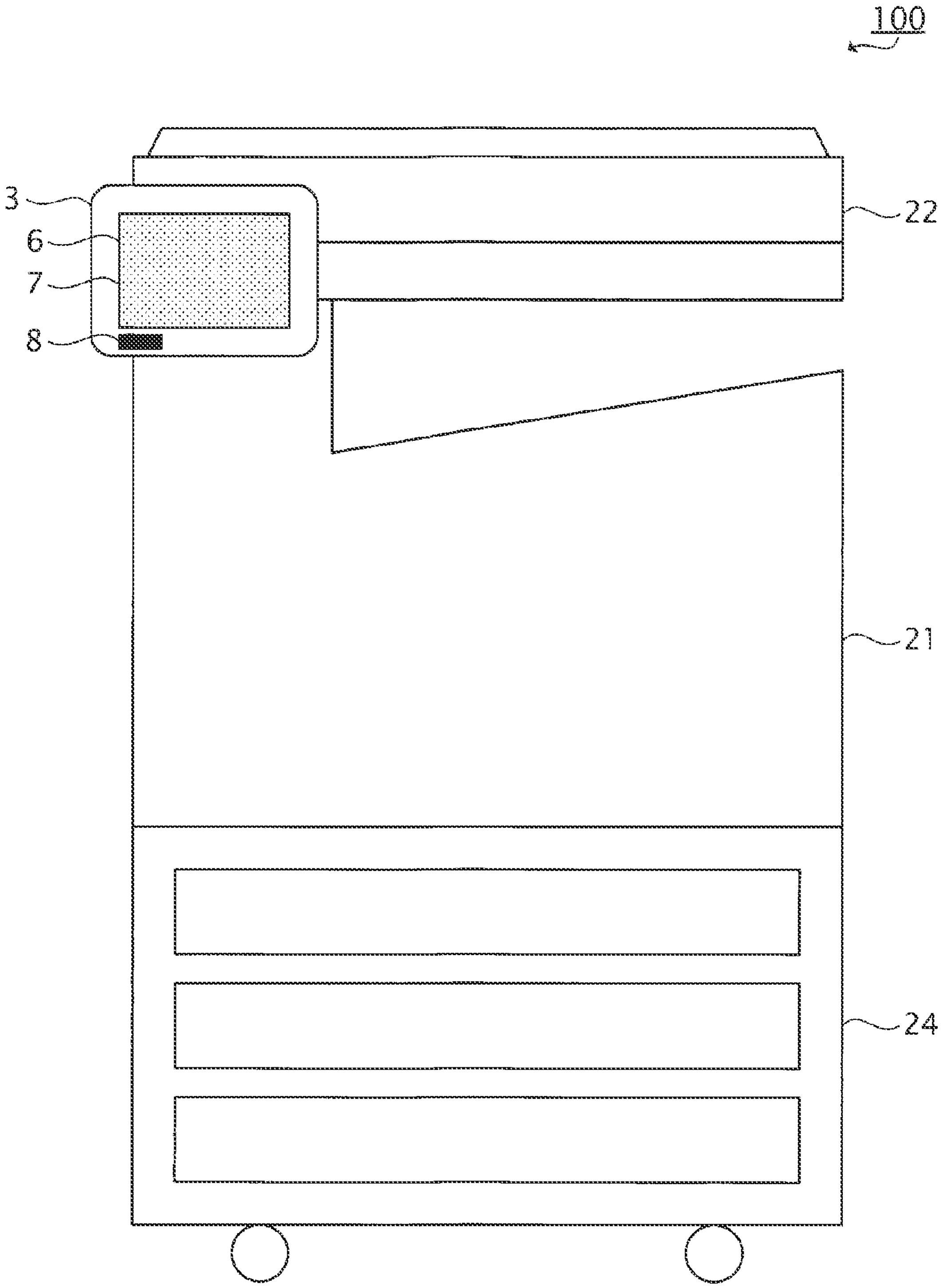
FIG. 1 is a diagram illustrating an example of an appearance of a printing apparatus according to an embodiment of the present disclosure.

With reference to the accompanying drawings, a certain embodiment of the present disclosure will now be explained. In the drawings, the dimensions and scales of components may be made different from those in actual implementation. Since the embodiment described below shows some preferred examples of the present disclosure, they contain various technically-preferred limitations. However, the scope of the present disclosure shall not be construed to be limited to the examples described below unless and except where the description contains an explicit mention of an intent to limit the present disclosure.

A. Embodiment

In the present embodiment, an image forming apparatus will be described while taking a printing apparatus 100 as an example.

1. Configuration of Printing Apparatus

Figure 2:
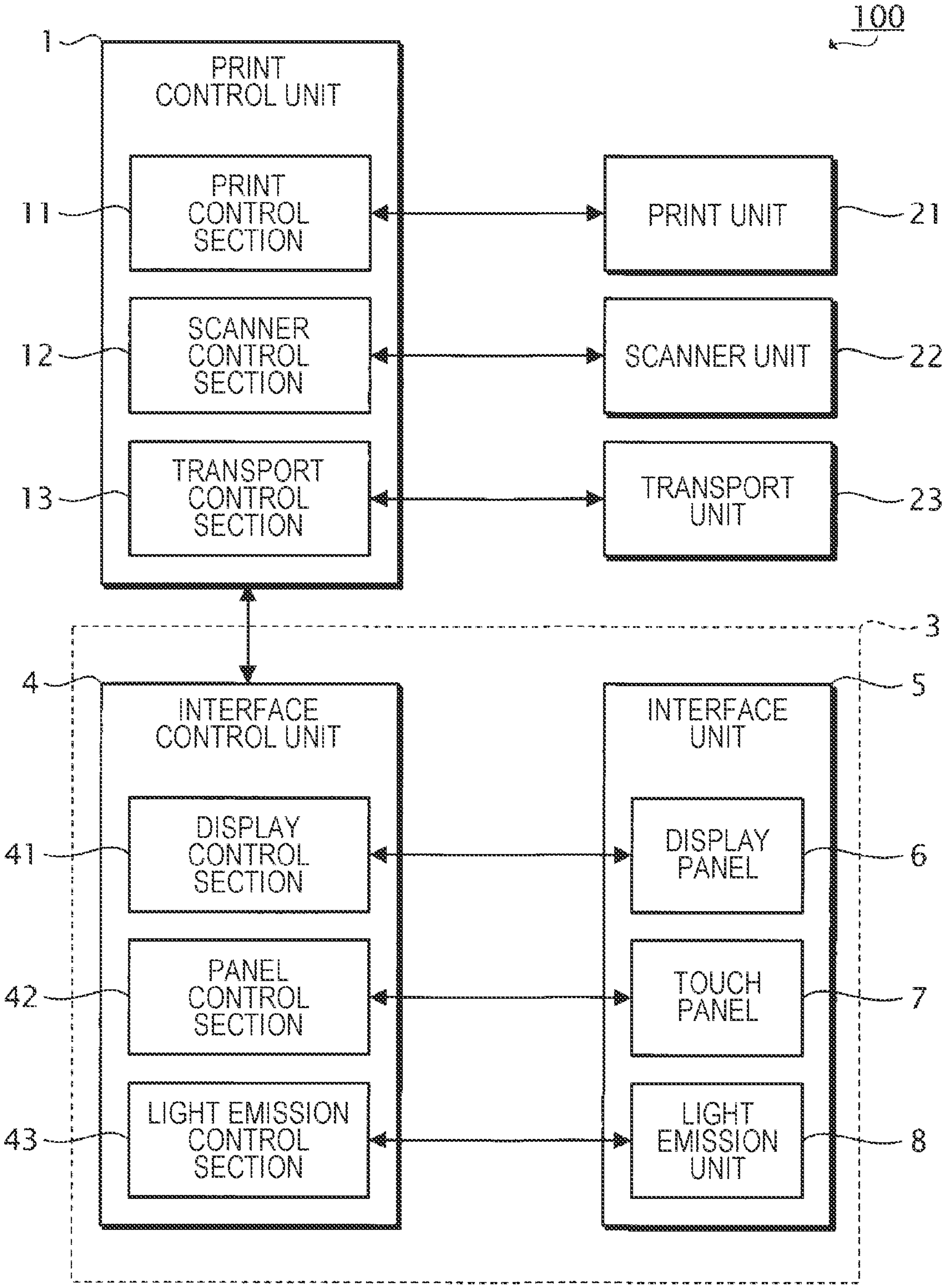
FIG. 2 is a block diagram illustrating an example of a configuration of the printing apparatus.
Figure 3:
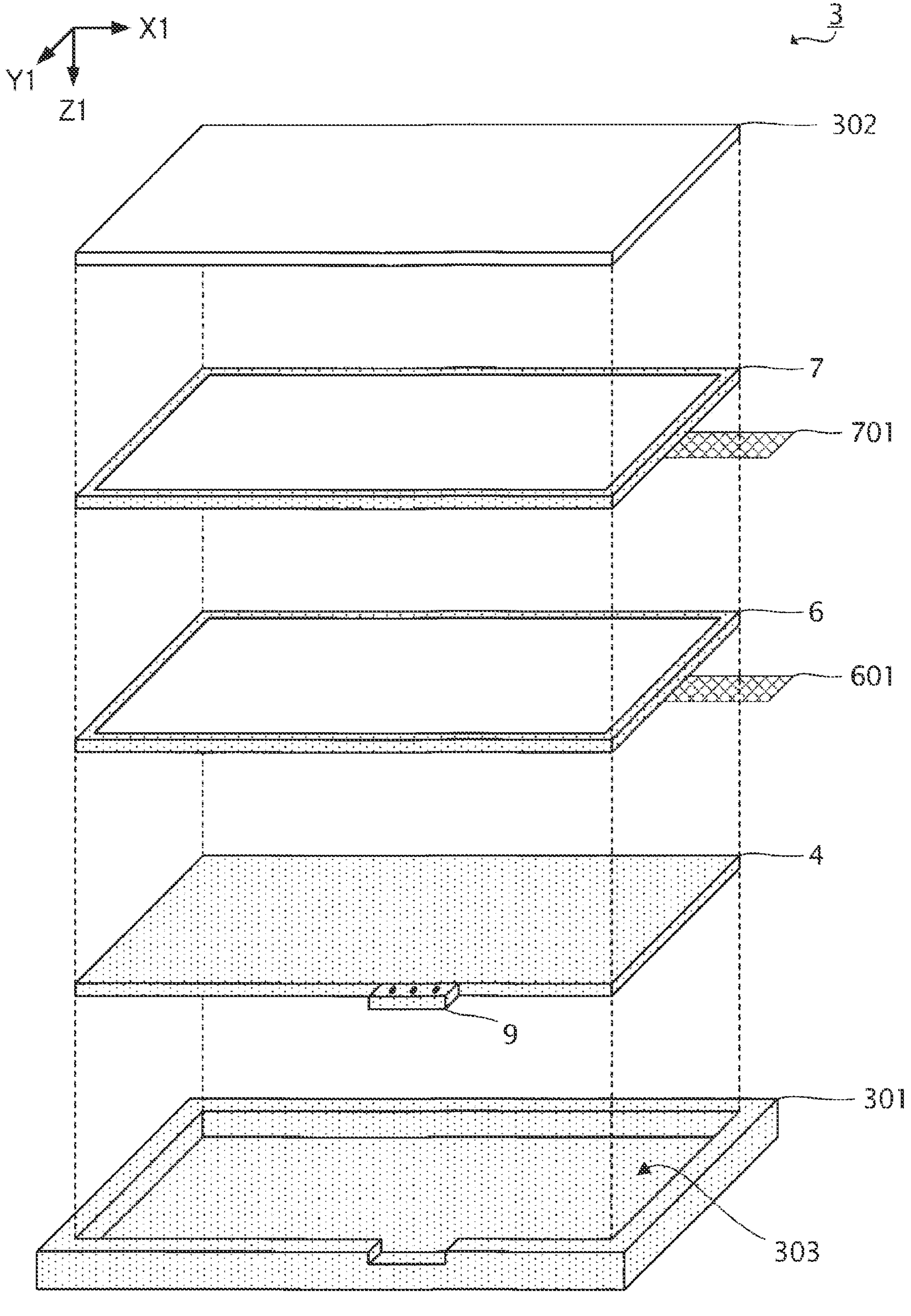
FIG. 3 is an exploded perspective view illustrating an example of a configuration of a display device.

With reference to FIGS. 1 to 3, a configuration of a printing apparatus 100 according to the present embodiment will now be schematically described.

FIG. 1 is a diagram illustrating an example of an appearance of the printing apparatus 100. FIG. 2 is a functional block diagram illustrating an example of a functional configuration of the printing apparatus 100.

As illustrated in FIGS. 1 and 2, the printing apparatus 100 includes a print control unit 1, a print unit 21, a scanner unit 22, a transport unit 23, and a sheet feeding unit 24.

The print unit 21 performs print processing of forming an image on printing paper PP by ejecting ink. In the present embodiment, the print unit 21 is an example of "image forming unit". The scanner unit 22 performs scan processing of reading an image formed on the printing paper PP or any other kind of medium. The sheet feeding unit 24 stores the printing paper PP. The transport unit 23 supplies the printing paper PP stored in the sheet feeding unit 24 to the print unit 21. Moreover, the transport unit 23 discharges the printing paper PP when the print unit 21 has formed an image on the printing paper PP.

The print control unit 1 includes a processing circuit such as a CPU, an FPGA, or the like. CPU is an acronym for Central Processing Unit. FPGA is an acronym for Field Programmable Gate Array. By running a control program of the printing apparatus 100 stored in a non-illustrated storage device and operating in accordance with the control program, the processing circuit provided in the print control unit 1 is capable of functioning as a print control section 11 configured to control the print unit 21, a scanner control section 12 configured to control the scanner unit 22, and a transport control section 13 configured to control the transport unit 23.

The printing apparatus 100 further includes a display device 3. The display device 3 includes an interface control unit 4 and an interface unit 5. The interface unit 5 includes a display panel 6, a touch panel 7, and a light emission unit 8.

The display panel 6 presents display of various kinds of information to the user of the printing apparatus 100. The touch panel 7 receives an input of a command from the user of the printing apparatus 100. The light emission unit 8 indicates status of some or all of the print unit 21, the scanner unit 22, and the transport unit 23 by means of a plurality of light sources.

In the present embodiment, it is assumed that the user is able to input information about settings of operation of the light emission unit 8 via the touch panel 7.

The interface control unit 4 includes a processing circuit such as a CPU, an FPGA, or the like. By running a control program of the display device 3 stored in a non-illustrated storage device and operating in accordance with the control program, the processing circuit provided in the interface control unit 4 is capable of functioning as a display control section 41 configured to control the display panel 6, a panel control section 42 configured to control the touch panel 7, and a light emission control section 43 configured to control the light emission unit 8.

FIG. 3 is an exploded perspective view illustrating an example of a configuration of the display device 3.

As illustrated in FIG. 3, the display device 3 includes a frame 301 and a glass cover 302 in addition to the above-described interface control unit 4, display panel 6, and touch panel 7. The display device 3 further includes a light emission device 9. The light emission device 9 includes a substrate 90 and a light guide 91 in addition to the above-described light emission unit 8. A detailed description will be given later.

The glass cover 302 extends on a plane whose normal-line direction is the Z1 direction, and is provided at the Z2-directional side, which is the opposite of the Z1-directional side, as viewed from the frame 301. The Z1 direction is the direction going from the user of the printing apparatus 100 toward the display device 3.

In the description below, the Z1 direction, and the Z2 direction, which is the opposite of the Z1 direction, will be collectively referred to as "Z-axis direction", the X1 direction, which intersects with the Z-axis direction, and the X2 direction, which is the opposite of the X1 direction, will be collectively referred to as "X-axis direction", and the Y1 direction, which intersects with the Z-axis direction and the X-axis direction, and the Y2 direction, which is the opposite of the Y1 direction, will be collectively referred to as "Y-axis direction". In the present embodiment, as an example, a case where the X-axis direction, the Y-axis direction, and the Z-axis direction are orthogonal to one another is assumed. However, the scope of the present disclosure is not limited to this exemplary configuration. It is sufficient as long as the X-axis direction, the Y-axis direction, and the Z-axis direction are directions intersecting with one another.

The frame 301 includes a recessed portion 303, which has an opening in the Z2 direction. The interface control unit 4, the display panel 6, the touch panel 7, and the light emission device 9 are housed in the recessed portion 303. The opening of the recessed portion 303 is hermetically closed by the glass cover 302.

In the present embodiment, the touch panel 7 is provided between the glass cover 302 and the display panel 6 in the recessed portion 303. Among them, the display panel 6 is provided in such a way as to extend on a plane whose normal-line direction is the Z1 direction. The display panel 6 is electrically coupled to the interface control unit 4 via a connector 601. The touch panel 7 is provided in such a way as to extend on a plane whose normal-line direction is the Z1 direction. The touch panel 7 is electrically coupled to the interface control unit 4 via a connector 701.

In the present embodiment, the interface control unit 4 is provided between the display panel 6 and the frame 301 in the recessed portion 303. In the present embodiment, the light emission device 9 and the interface control unit 4 share the substrate 90. The substrate 90 is provided in such a way as to extend on a plane whose normal-line direction is the Z1 direction.

2. Configuration of Light Emission Device

Figure 4:
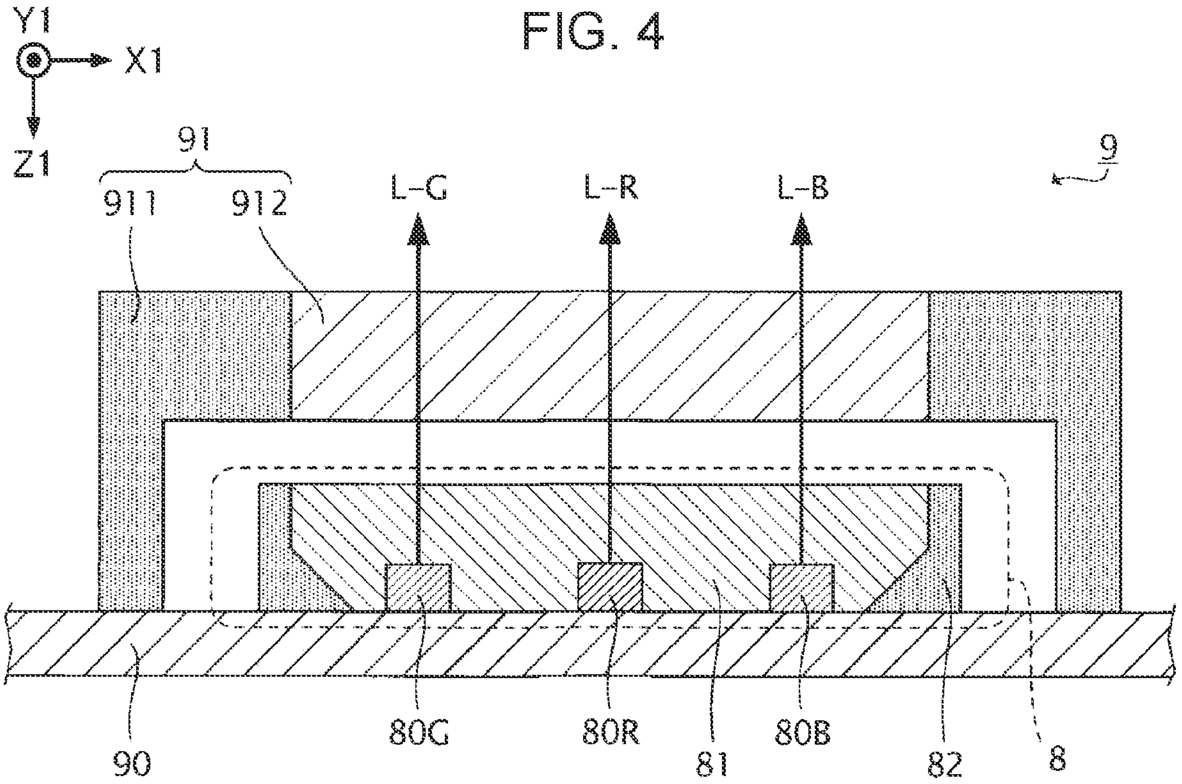
FIG. 4 is a cross-sectional view illustrating an example of a configuration of a light emission device.
Figure 5:
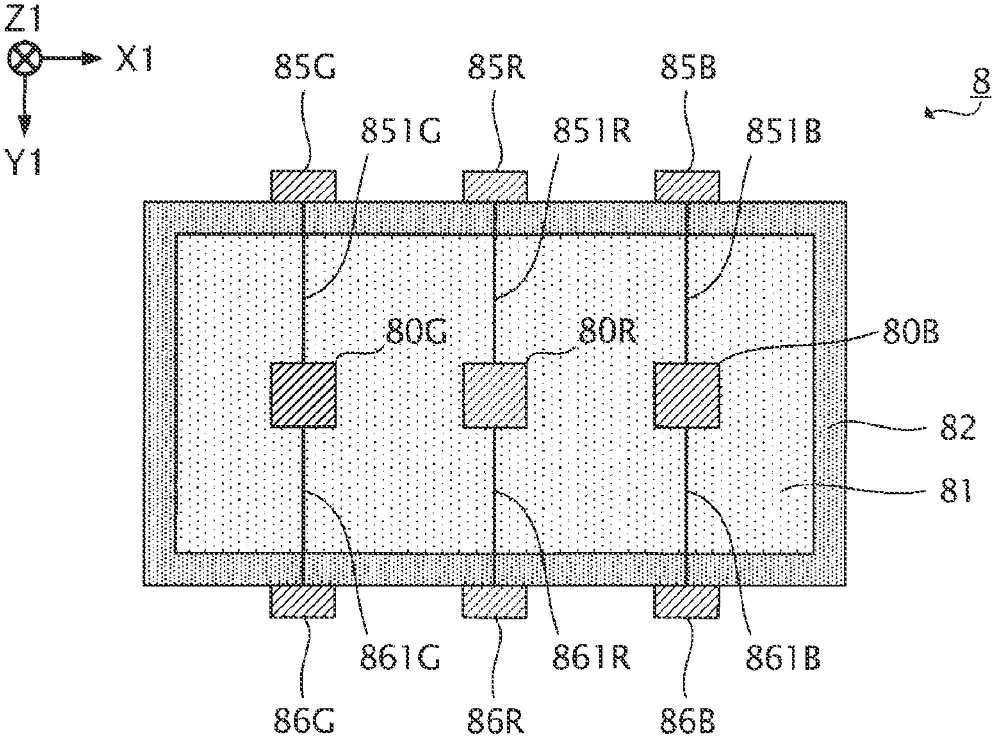
FIG. 5 is a plan view illustrating an example of a configuration of a light emission unit.

With reference to FIGS. 4 and 5, a configuration of the light emission device 9 according to the present embodiment will now be schematically described.

FIG. 4 is a cross-sectional view of the light emission device 9 when the light emission device 9 is cut along a plane whose normal-line direction is the Y1 direction. FIG. 5 is a plan view of the light emission unit 8 when the light emission unit 8 of the light emission device 9 viewed in plan in the Z1 direction.

As illustrated in FIGS. 4 and 5, the light emission device 9 includes the light emission unit 8, the substrate 90, and the light guide 91. Among them, the light emission unit 8 includes a plurality of light sources 80, a sealant 81, and a frame 82. The light emission unit 8 further includes a plurality of terminals 85, which includes a terminal 85R, a terminal 85G, and a terminal 85B, a plurality of terminals 86, which includes a terminal 86R, a terminal 86G, and a terminal 86B, a plurality of wiring lines 851, which includes a wiring line 851R, a wiring line 851G, and a wiring line 851B, and a plurality of wiring lines 861, which includes a wiring line 861R, a wiring line 861G, and a wiring line 861B.

In the present embodiment, a case where the light emission unit 8 includes three light sources 80, specifically, a light source 80R that emits red light L-R, a light source 80G that emits green light L-G, and a light source 80B that emits blue light L-B, is assumed. In addition, in the present embodiment, a case where the light sources 80 are light emitting diodes (LED) is assumed. Specifically, in the present embodiment, as an example, the light source 80R is assumed to be formed of aluminum indium gallium phosphide as a main material, the light source 80G is assumed to be formed of indium gallium nitride as a main material, and the light source 80B is assumed to be formed of indium gallium nitride as a main material.

In addition, in the present embodiment, a case where the light sources 80 are fixed to the substrate 90 by using a surface mount technology (SMT) is assumed. That is, in the present embodiment, the light sources 80 are assumed to be surface mount devices (SMD). Specifically, in the present embodiment, the light sources 80 are assumed to be soldered to the substrate 90.

In addition, in the present embodiment, a case where lead-free solder is used as the solder for fixing the light sources 80 to the substrate 90 is assumed. Specifically, in the present embodiment, Sn—Cu solder, Sn—Ag—Cu solder, Sn—Ag—Bi—Cu solder, or the like may be used as the solder for fixing the light sources 80 to the substrate 90.

In the present embodiment, the light emission unit 8 includes six terminals, which are: the terminals 85R and 86R provided to correspond to the light source 80R, the terminals 85G and 86G provided to correspond to the light source 80G, the terminals 85B and 86B provided to correspond to the light source 80B. Each of the terminals 85 and each of the terminals 86 are electrically coupled to the light emission control section 43. In addition, the light emission unit 8 includes six wiring lines, which are: the wiring line 851R for electric coupling between the anode of the light source 80R and the terminal 85R, the wiring line 861R for electric coupling between the cathode of the light source 80R and the terminal 86R, the wiring line 851G for electric coupling between the anode of the light source 80G and the terminal 85G, the wiring line 861G for electric coupling between the cathode of the light source 80G and the terminal 86G, the wiring line 851B for electric coupling between the anode of the light source 80B and the terminal 85B, and the wiring line 861B for electric coupling between the cathode of the light source 80B and the terminal 86B.

In the present embodiment, the light emission control section 43 causes the red light L-R to be emitted from the light source 80R by causing an electric current to flow from the terminal 85R to the terminal 86R. The light emission control section 43 causes the green light L-G to be emitted from the light source 80G by causing an electric current to flow from the terminal 85G to the terminal 86G. The light emission control section 43 causes the blue light L-B to be emitted from the light source 80B by causing an electric current to flow from the terminal 85B to the terminal 86B.

In the present embodiment, a case where the light source 80R, the light source 80G, and the light source 80B are configured in the form of a single package in the light emission unit 8 is assumed. Specifically, in the present embodiment, the light source 80R, the light source 80G, and the light source 80B are sealed by a mass of the sealant 81. The sealant 81 is formed of a light transmissive material. In the present embodiment, a silicone resin is used as the sealant 81. In addition, in the present embodiment, the light source 80R, the light source 80G, and the light source 80B are housed in a single frame 82. Incidentally, in the present embodiment, the frame 82 is formed of a light reflective material. In addition, in the present embodiment, the frame 82 has a shape for reflecting, in the Z2 direction, the light emitted from the light sources 80.

In the present embodiment, the light guide 91 includes a light shielding portion 911 and a light guiding path 912. Among them, the light shielding portion 911 is formed of a light shielding material. The light guiding path 912 is formed of a light transmissive material. The light guiding path 912 is provided at the Z2-directional side as viewed from the light emission unit 8 in such a way as to be located between the user of the printing apparatus 100 and the light emission unit 8. That is, the user of the printing apparatus 100 sees, through the light guiding path 912, the light emitted by the light emission unit 8.

3. Operation of Light Emission Unit

With reference to FIGS. 6 to 10, operation of the light emission unit 8 and the light emission control section 43 according to the present embodiment will now be schematically described.

FIG. 6 is a diagram for explaining an example of operation modes of the light emission unit 8. FIG. 7 is a diagram for explaining an example of light emission modes of the light emission unit 8. FIG. 8 is a diagram for explaining an example of lighting modes of the light emission unit 8.

As illustrated in FIG. 6, in the present embodiment, the light emission unit 8 is configured to operate in a plurality of operation modes MD, including operation in a normal operation mode MD1 and operation in an energy-saving operation mode MD2.

The normal operation mode MD1 is an operation mode MD in which the number of light sources 80 that are ON at the same time, among the plurality of light sources 80 of the light emission unit 8, is allowed to be two or more. The energy-saving operation mode MD2 is an operation mode MD in which the number of light sources 80 that are ON at the same time, among the plurality of light sources 80 of the light emission unit 8, is limited to one or less. That is, the energy-saving operation mode MD2 is an operation mode MD in which an amount of power consumption is smaller than in the normal operation mode MD1.

As illustrated in FIG. 7, in the present embodiment, the light emission unit 8 is configured to perform light emission based on a plurality of light emission modes ML, including light emission based on a red-and-green two-color light emission mode MM1, light emission based on a red-and-blue two-color light emission mode MM2, light emission based on a red light emission mode MN1, light emission based on a green light emission mode MN2, and light emission based on a blue light emission mode MN3.

The red-and-green two-color light emission mode MM1 is a light emission mode ML in which, among the plurality of light sources 80 of the light emission unit 8, the light source 80R and the light source 80G are caused to emit light. The red-and-blue two-color light emission mode MM2 is a light emission mode ML in which, among the plurality of light sources 80 of the light emission unit 8, the light source 80R and the light source 80B are caused to emit light. The red light emission mode MN1 is a light emission mode ML in which, among the plurality of light sources 80 of the light emission unit 8, the light source 80R is caused to emit light. The green light emission mode MN2 is a light emission mode ML in which, among the plurality of light sources 80 of the light emission unit 8, the light source 80G is caused to emit light. The blue light emission mode MN3 is a light emission mode ML in which, among the plurality of light sources 80 of the light emission unit 8, the light source 80B is caused to emit light.

In the description below, the red-and-green two-color light emission mode MM1 and the red-and-blue two-color light emission mode MM2 will be collectively referred to as "multi-color light emission mode MM". In the present embodiment, the light emission unit 8 is configured to operate in the multi-color light emission mode MM as its light emission mode ML when its operation mode MD is the normal operation mode MD1. In addition, in the description below, the red light emission mode MN1, the green light emission mode MN2, and the blue light emission mode MN3 will be collectively referred to as "mono-color light emission mode MN". In the present embodiment, the light emission unit 8 is configured to operate in the mono-color light emission mode MN as its light emission mode ML when its operation mode MD is the energy-saving operation mode MD2.

As illustrated in FIG. 8, in the present embodiment, the light emission unit 8 is configured to perform lighting in a plurality of lighting modes MT, including lighting in a long-cycle blinking mode MT1, lighting in a short-cycle blinking mode MT2, and lighting in an always-light-ON mode MT3.

The long-cycle blinking mode MT1 is a lighting mode MT in which some or all of the plurality of light sources 80 of the light emission unit 8 are caused to blink at the same time, with alternation between ON and OFF, in a long cycle that is not shorter than a predetermined cycle. The short-cycle blinking mode MT2 is a lighting mode MT in which some or all of the plurality of light sources 80 of the light emission unit 8 are caused to blink at the same time, with alternation between ON and OFF, in a short cycle that is shorter than the predetermined cycle. The always-light-ON mode MT3 is a lighting mode MT in which some or all of the plurality of light sources 80 of the light emission unit 8 are caused to be always ON concurrently.

Figure 9:
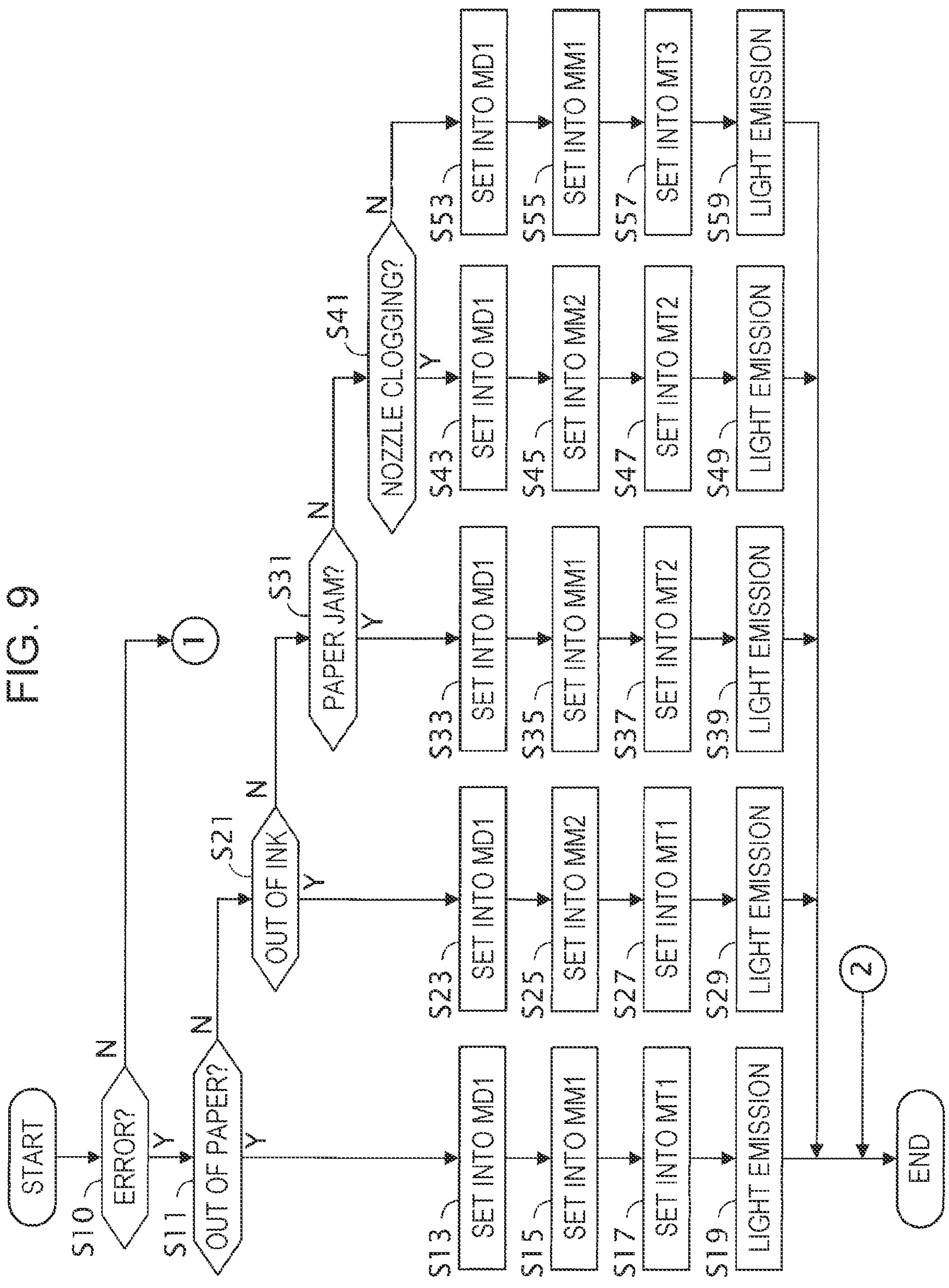
FIG. 9 is a flowchart illustrating an example of operation of the display device.
Figure 10:
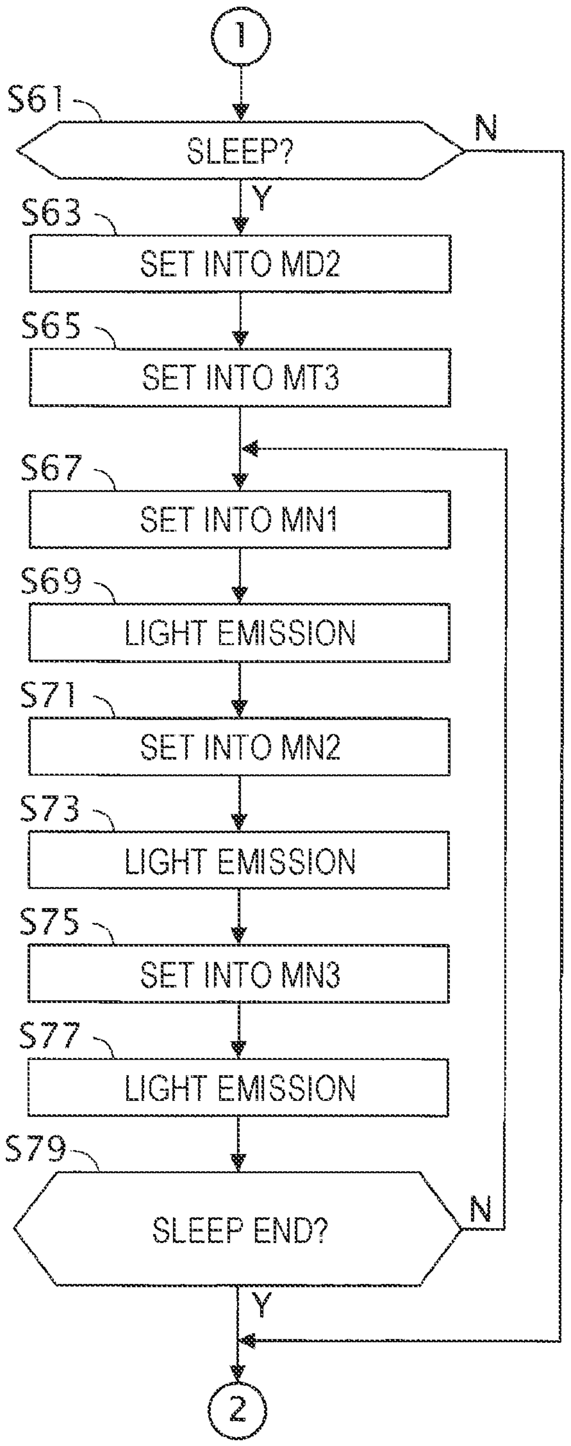
FIG. 10 is a flowchart illustrating an example of operation of the display device.

FIGS. 9 and 10 are flowcharts for explaining an example of operation of the light emission unit 8 and the light emission control section 43 when the display device 3 performs lighting processing of causing some or all of the plurality of light sources 80 of the light emission unit 8 to be ON. In the present embodiment, the display device 3 performs the lighting processing when print processing or scan processing is executed on the printing apparatus 100. In addition, in the present embodiment, the display device 3 performs the lighting processing periodically in a predetermined cycle when print processing or scan processing is not executed on the printing apparatus 100.

As illustrated in FIG. 9, when the lighting processing is started, the light emission control section 43 acquires running status information, which indicates running status of the print unit 21, the scanner unit 22, and the transport unit 23, from the print control unit 1, and, based on the running status information, determines whether or not an error has occurred on the print unit 21, the scanner unit 22, or the transport unit 23 (S10).

When the result of the determination in the step S10 is yes, based on the running status information, the light emission control section 43 determines whether or not the error having been recognized in the step S10 is an error that the printing paper PP stored in the sheet feeding unit 24 has run out, that is, what is called "out of paper" (S11). When the result of the determination in the step S11 is no, based on the running status information, the light emission control section 43 determines whether or not the error having been recognized in the step S10 is an error that the ink stored in the printing apparatus 100 has run out, that is, what is called "out of ink" (S21). When the result of the determination in the step S21 is no, based on the running status information, the light emission control section 43 determines whether or not the error having been recognized in the step S10 is an error that the transport unit 23 is in a state of being unable to transport the printing paper PP, that is, what is called "paper jam" (S31). When the result of the determination in the step S31 is no, based on the running status information, the light emission control section 43 determines whether or not the error having been recognized in the step S10 is an error that the print unit 21 is in a state of being unable to eject ink properly, that is, what is called "nozzle clogging" (S41).

When the result of the determination in the step S11 is yes, the light emission control section 43 sets the operation mode MD of the light emission unit 8 into the normal operation mode MD1 (S13). Next, the light emission control section 43 sets the light emission mode ML of the light emission unit 8 into the red-and-green two-color light emission mode MM1 (S15). In addition, the light emission control section 43 sets the lighting mode MT of the light emission unit 8 into the long-cycle blinking mode MT1 (S17).

Then, the light emission control section 43 causes a plurality of light sources 80 of the light emission unit 8 to emit light in a manner corresponding to the normal operation mode MD1 having been set in the step S13, the red-and-green two-color light emission mode MM1 having been set in the step S15, and the long-cycle blinking mode MT1 having been set in the step S17 (S19). Specifically, the light emission control section 43 causes the light source 80R and the light source 80G, among the plurality of light sources 80 of the light emission unit 8, to blink in a long cycle such that the light source 80R and the light source 80G are turned ON at the same time and are turned OFF at the same time.

When the result of the determination in the step S21 is yes, the light emission control section 43 sets the operation mode MD of the light emission unit 8 into the normal operation mode MD1 (S23). Next, the light emission control section 43 sets the light emission mode ML of the light emission unit 8 into the red-and-blue two-color light emission mode MM2 (S25). In addition, the light emission control section 43 sets the lighting mode MT of the light emission unit 8 into the long-cycle blinking mode MT1 (S27).

Then, the light emission control section 43 causes a plurality of light sources 80 of the light emission unit 8 to emit light in a manner corresponding to the normal operation mode MD1 having been set in the step S23, the red-and-blue two-color light emission mode MM2 having been set in the step S25, and the long-cycle blinking mode MT1 having been set in the step S27 (S29). Specifically, the light emission control section 43 causes the light source 80R and the light source 80B, among the plurality of light sources 80 of the light emission unit 8, to blink in a long cycle such that the light source 80R and the light source 80B are turned ON at the same time and are turned OFF at the same time.

When the result of the determination in the step S31 is yes, the light emission control section 43 sets the operation mode MD of the light emission unit 8 into the normal operation mode MD1 (S33). Next, the light emission control section 43 sets the light emission mode ML of the light emission unit 8 into the red-and-green two-color light emission mode MM1 (S35). In addition, the light emission control section 43 sets the lighting mode MT of the light emission unit 8 into the short-cycle blinking mode MT2 (S37).

Then, the light emission control section 43 causes a plurality of light sources 80 of the light emission unit 8 to emit light in a manner corresponding to the normal operation mode MD1 having been set in the step S33, the red-and-green two-color light emission mode MM1 having been set in the step S35, and the short-cycle blinking mode MT2 having been set in the step S37 (S39). Specifically, the light emission control section 43 causes the light source 80R and the light source 80G, among the plurality of light sources 80 of the light emission unit 8, to blink in a short cycle such that the light source 80R and the light source 80G are turned ON at the same time and are turned OFF at the same time.

When the result of the determination in the step S41 is yes, the light emission control section 43 sets the operation mode MD of the light emission unit 8 into the normal operation mode MD1 (S43). Next, the light emission control section 43 sets the light emission mode ML of the light emission unit 8 into the red-and-blue two-color light emission mode MM2 (S45). In addition, the light emission control section 43 sets the lighting mode MT of the light emission unit 8 into the short-cycle blinking mode MT2 (S47).

Then, the light emission control section 43 causes a plurality of light sources 80 of the light emission unit 8 to emit light in a manner corresponding to the normal operation mode MD1 having been set in the step S43, the red-and-blue two-color light emission mode MM2 having been set in the step S45, and the short-cycle blinking mode MT2 having been set in the step S47 (S49). Specifically, the light emission control section 43 causes the light source 80R and the light source 80B, among the plurality of light sources 80 of the light emission unit 8, to blink in a short cycle such that the light source 80R and the light source 80B are turned ON at the same time and are turned OFF at the same time.

When the result of the determination in the step S41 is no, the light emission control section 43 sets the operation mode MD of the light emission unit 8 into the normal operation mode MD1 (S53). Next, the light emission control section 43 sets the light emission mode ML of the light emission unit 8 into the red-and-green two-color light emission mode MM1 (S55). In addition, the light emission control section 43 sets the lighting mode MT of the light emission unit 8 into the always-light-ON mode MT3 (S57).

Then, the light emission control section 43 causes a plurality of light sources 80 of the light emission unit 8 to emit light in a manner corresponding to the normal operation mode MD1 having been set in the step S53, the red-and-green two-color light emission mode MM1 having been set in the step S55, and the always-light-ON mode MT3 having been set in the step S57 (S59). Specifically, the light emission control section 43 causes the light source 80R and the light source 80G, among the plurality of light sources 80 of the light emission unit 8, to be always ON.

When the light sources 80 emit light in the step S19, S29, S39, S49, or S59, the light emission control section 43 causes them to continue the light emission until the user makes some action to the printing apparatus 100.

As illustrated in FIG. 10, when the result of the determination in the step S10 is no, based on the running status information, the light emission control section 43 determines whether or not the printing apparatus 100 is in a sleep state (S61). The sleep state is a state in which the print unit 21, the scanner unit 22, and the transport unit 23 are not running for a certain length of time or longer and, in addition, there is no input of information into the touch panel 7 for a certain length of time or longer.

When the result of the determination in the step S61 is no, the light emission control section 43 terminates the lighting processing.

When the result of the determination in the step S61 is yes, the light emission control section 43 sets the operation mode MD of the light emission unit 8 into the energy-saving operation mode MD2 (S63). Next, the light emission control section 43 sets the lighting mode MT of the light emission unit 8 into the always-light-ON mode MT3 (S65). In addition, the light emission control section 43 sets the light emission mode ML of the light emission unit 8 into the red light emission mode MN1 (S67).

Then, the light emission control section 43 causes one of the plurality of light sources 80 of the light emission unit 8 to emit light for a predetermined time in a manner corresponding to the energy-saving operation mode MD2 having been set in the step S63, the always-light-ON mode MT3 having been set in the step S65, and the red light emission mode MN1 having been set in the step S67 (S69). Specifically, the light emission control section 43 causes the light source 80R, among the plurality of light sources 80 of the light emission unit 8, to be ON for a predetermined time.

Next, upon the lapse of the predetermined time from the turning ON of the light source 80R in the step S69, the light emission control section 43 sets the light emission mode ML of the light emission unit 8 into the green light emission mode MN2 (S71).

Then, the light emission control section 43 causes one of the plurality of light sources 80 of the light emission unit 8 to emit light for a predetermined time in a manner corresponding to the energy-saving operation mode MD2 having been set in the step S63, the always-light-ON mode MT3 having been set in the step S65, and the green light emission mode MN2 having been set in the step S71 (S73). Specifically, the light emission control section 43 causes the light source 80G, among the plurality of light sources 80 of the light emission unit 8, to be ON for a predetermined time.

Next, upon the lapse of the predetermined time from the turning ON of the light source 80G in the step S79, the light emission control section 43 sets the light emission mode ML of the light emission unit 8 into the blue light emission mode MN3 (S75).

Then, the light emission control section 43 causes one of the plurality of light sources 80 of the light emission unit 8 to emit light for a predetermined time in a manner corresponding to the energy-saving operation mode MD2 having been set in the step S63, the always-light-ON mode MT3 having been set in the step S65, and the blue light emission mode MN3 having been set in the step S75 (S77). Specifically, the light emission control section 43 causes the light source 80B, among the plurality of light sources 80 of the light emission unit 8, to be ON for a predetermined time.

Based on the running status information, the light emission control section 43 thereafter determines whether or not the sleep state of the printing apparatus 100 has ended (S79). When the result of the determination in the step S79 is yes, the light emission control section 43 terminates the lighting processing. When the result of the determination in the step S79 is no, the light emission control section 43 returns the process to the step S67.

4. Conclusion of Embodiment

As described above, the printing apparatus 100 according to a first aspect of the present embodiment includes: the print unit 21 that forms an image on the printing paper PP by applying ink onto the printing paper PP; the transport unit 23 that transports the printing paper PP; and the light emission unit 8 that indicates status of either one, or both, of the print unit 21 and the transport unit 23 by using the plurality of light sources 80 including the light source 80R that emits the red light L-R and the light source 80G that emits the green light L-G, wherein in the light emission unit 8, the plurality of light sources 80 is configured as a single package.

Note that, in the present embodiment, the printing paper PP is an example of "medium", ink is an example of "colorant", the red light L-R is an example of "light having a first wavelength", the green light L-G is an example of "light having a second wavelength", the light source 80R is an example of "first light source", and the light source 80G is an example of "second light source".

As described above, according to the present embodiment, since the plurality of light sources 80 is configured as a single package in the light emission unit 8, as compared with a configuration in which the plurality of light sources 80 is provided individually, it is possible to reduce the possibility of adhesion of dust to each of the light sources 80 and the possibility of adhesion of ink mist to each of the light sources 8. For this reason, according to the present embodiment, as compared with a configuration in which the plurality of light sources 80 is provided individually, it is possible to reduce the possibility of breakdown of each of the light sources 80 of the light emission unit 8 due to dust or ink mist suspended in air and thus make the service life of the light emission unit 8 longer. That is, according to the present embodiment, as compared with a configuration in which the plurality of light sources 80 is provided individually, it is possible to reduce the possibility that the light emission unit 8 will turn into a waste and thus contribute to achieving a significant reduction in waste generation through prevention and reduction of waste generation, as set forth in Target "12.5" of SDGS.

Moreover, according to the present embodiment, since the plurality of light sources 80 is configured as a single package in the light emission unit 8, at the time of disposal of the light emission unit 8, it is possible to throw away the plurality of light sources 80 provided in the light emission unit 8 together. For this reason, according to the present embodiment, as compared with a configuration in which the plurality of light sources 80 provided in the light emission unit 8 is each thrown away individually, it is possible to manage the light sources 80 as a waste properly at the time of disposal of the light emission unit 8 and reduce the possibility of improper disposal of each of the light sources 80. That is, according to the present embodiment, as compared with a configuration in which the plurality of light sources 80 is provided individually, it is possible to realize waste management at the time of disposal of the light emission unit 8 and thus contribute to achieving a significant reduction in release of chemicals, etc. contained in the waste to air, water, and soil, as set forth in Target "12.4" of SDGs.

As described above, according to the present embodiment, as compared with a configuration in which the plurality of light sources 80 is provided individually, it is possible to significantly contribute to attaining SDGs Goal 12: "Ensure sustainable consumption and production patterns".

Moreover, according to the present embodiment, since the plurality of light sources 80 is configured as a single package in the light emission unit 8, at the time of disposal of the light emission unit 8, it is possible to throw away the plurality of light sources 80 provided in the light emission unit 8 together. For this reason, according to the present embodiment, as compared with a configuration in which the plurality of light sources 80 provided in the light emission unit 8 is each thrown away individually, it is possible to manage the light sources 80 as a waste properly at the time of disposal of the light emission unit 8 and reduce the possibility of improper disposal of each of the light sources 80. That is, according to the present embodiment, as compared with a configuration in which the plurality of light sources 80 is provided individually, it is possible to contribute to achieving a significant reduction in the number of deaths and illnesses caused by air, water and soil pollution/contamination ascribable to the waste at the time of disposal of the light emission unit 8, as set forth in Target "3.9" of SDGs.

As described above, according to the present embodiment, as compared with a configuration in which the plurality of light sources 80 is provided individually, it is possible to significantly contribute to attaining SDGs Goal 3: "Ensure healthy lives and promote well-being for all at all ages".

Moreover, according to the present embodiment, since the plurality of light sources 80 is configured as a single package in the light emission unit 8, as compared with a configuration in which the plurality of light sources 80 is provided individually, it is possible to manage the light sources 80 thrown away as the waste properly at the time of disposal of the light emission unit 8 and reduce the possibility that the light sources 80 thrown away as the waste will have an adverse influence on the environment. That is, according to the present embodiment, as compared with a configuration in which the plurality of light sources 80 is provided individually, it is possible to pay special attention to waste management at the time of disposal of the light emission unit 8 and reduce an adverse per capita environmental impact of cities, as set forth in Target "11.6" of SDGs.

As described above, according to the present embodiment, as compared with a configuration in which the plurality of light sources 80 is provided individually, it is possible to significantly contribute to attaining SDGs Goal 11: "Make cities and human settlements inclusive, safe, resilient and sustainable".

Moreover, according to the present embodiment, since the plurality of light sources 80 is configured as a single package in the light emission unit 8, as compared with a configuration in which the plurality of light sources 80 is provided individually, it is possible to make the work of attaching and detaching the light emission unit 8 easier in the processes of manufacturing and disposal of the light emission unit 8. Therefore, according to the present embodiment, as compared with a configuration in which the plurality of light sources 80 is provided individually, it is possible to lower the barrier for physically challenged people and elderly people to participate in work for manufacturing and disposal of the light emission unit 8 and thus increase the possibility of creating new jobs for physically challenged people and elderly people. That is, according to the present embodiment, as compared with a configuration in which the plurality of light sources 80 is provided individually, it is possible to achieve empowerment such that no one will be left behind socially, economically, and politically, irrespective of age, gender, disability, race, ethnicity, origin, religion, or economic or other status, as set forth in Target "10.2" of SDGs.

As described above, according to the present embodiment, as compared with a configuration in which the plurality of light sources 80 is provided individually, it is possible to significantly contribute to attaining SDGs Goal 10: "Reduce inequality within and among countries".

In the printing apparatus 100 according to the first aspect of the present embodiment, the plurality of light sources 80 is fixed to the substrate 90 by using a surface mount technology.

For this reason, according to the present embodiment, as compared with a configuration in which the plurality of light sources 80 is fixed to the substrate 90 by using a through-hole mount technology, it is possible to make a wiring line for electric coupling to each of the light sources 80 shorter on the substrate 90. By this means, according to the present embodiment, as compared with a configuration in which the plurality of light sources 80 is fixed to the substrate 90 by using a through-hole mount technology, it is possible to reduce the possibility of adhesion of dust and ink mist to the wiring line for electric coupling to each of the light sources 80 and thus make the service life of the light emission unit 8 longer. That is, according to the present embodiment, as compared with a configuration in which the plurality of light sources 80 is fixed to the substrate 90 by using a through-hole mount technology, it is possible to reduce the possibility that the light emission unit 8 will turn into a waste and thus contribute to achieving a significant reduction in waste generation through prevention and reduction of waste generation, as set forth in Target "12.5" of SDGs.

As described above, according to the present embodiment, as compared with a configuration in which the plurality of light sources 80 is fixed to the substrate 90 by using a through-hole mount technology, it is possible to significantly contribute to attaining SDGs Goal 12: "Ensure sustainable consumption and production patterns".

In the printing apparatus 100 according to the first aspect of the present embodiment, the light emission unit 8 includes the sealant 81 that seals the plurality of light sources 80.

For this reason, according to the present embodiment, as compared with a configuration in which the light emission unit 8 does not include the sealant 81, it is possible to reduce the possibility of adhesion of dust and ink mist to each of the light sources 80 and thus make the service life of the light emission unit 8 longer. That is, according to the present embodiment, as compared with a configuration in which the light emission unit 8 does not include the sealant 81, it is possible to reduce the possibility that the light emission unit 8 will turn into a waste and thus contribute to achieving a significant reduction in waste generation through prevention and reduction of waste generation, as set forth in Target "12.5" of SDGs.

As described above, according to the present embodiment, as compared with a configuration in which the light emission unit 8 does not include the sealant 81, it is possible to significantly contribute to attaining SDGs Goal 12: "Ensure sustainable consumption and production patterns".

In the printing apparatus 100 according to the first aspect of the present embodiment, the sealant 81 is a silicone resin.

For this reason, according to the present embodiment, as compared with a configuration in which a material other than a silicone resin, for example, an epoxy resin, is used as the sealant 81, it is possible to reduce the possibility of discoloration due to the influence of light emitted from each of the light sources 80, especially, short-wavelength light such as the blue light L-B, and thus make the service life of the light emission unit 8 longer. That is, according to the present embodiment, as compared with a configuration in which a material other than a silicone resin is used as the sealant 81, it is possible to reduce the possibility that the light emission unit 8 will turn into a waste and thus contribute to achieving a significant reduction in waste generation through prevention and reduction of waste generation, as set forth in Target "12.5" of SDGs.

As described above, according to the present embodiment, as compared with a configuration in which a material other than a silicone resin is used as the sealant 81, it is possible to significantly contribute to attaining SDGs Goal 12: "Ensure sustainable consumption and production patterns".

In the printing apparatus 100 according to the first aspect of the present embodiment, the plurality of light sources 80 is fixed to the substrate 90 by using lead-free solder.

For this reason, according to the present embodiment, as compared with a configuration in which the plurality of light sources 80 is fixed to the substrate 90 by using lead-containing solder, it is possible to reduce the possibility of air, water and soil pollution/contamination at the time of disposal of the light emission unit 8. That is, according to the present embodiment, as compared with a configuration in which the plurality of light sources 80 is fixed to the substrate 90 by using lead-containing solder, it is possible to contribute to achieving a significant reduction in the number of deaths and illnesses caused by air, water and soil pollution/contamination ascribable to the waste at the time of disposal of the light emission unit 8, as set forth in Target "3.9" of SDGs.

As described above, according to the present embodiment, as compared with a configuration in which the plurality of light sources 80 is fixed to the substrate 90 by using lead-containing solder, it is possible to significantly contribute to attaining SDGs Goal 3: "Ensure healthy lives and promote well-being for all at all ages".

The printing apparatus 100 according to the first aspect of the present embodiment further includes the light guide 91 in which the light guiding path 912 is provided, and light emitted by each of the plurality of light sources 80 of the light emission unit 8 goes out through the light guiding path 912 provided in the light guide 91.

For this reason, according to the present embodiment, as compared with a configuration in which the printing apparatus 100 does not include the light guide 91, it is possible to reduce the possibility of adhesion of dust and ink mist to each of the light sources 80 and thus make the service life of the light emission unit 8 longer. That is, according to the present embodiment, as compared with a configuration in which the printing apparatus 100 does not include the light guide 91, it is possible to reduce the possibility that the light emission unit 8 will turn into a waste and thus contribute to achieving a significant reduction in waste generation through prevention and reduction of waste generation, as set forth in Target "12.5" of SDGs.

As described above, according to the present embodiment, as compared with a configuration in which the printing apparatus 100 does not include the light guide 91, it is possible to significantly contribute to attaining SDGs Goal 12: "Ensure sustainable consumption and production patterns".

In the printing apparatus 100 according to the first aspect of the present embodiment, the light source 80R contains aluminum indium gallium phosphide, and the light source 80G contains indium gallium nitride.

For this reason, according to the present embodiment, it is possible to make the light emission efficiency of the light source 80R and the light emission efficiency of the light source 80G approximately the same as each other and thus make it easier to control the intensity of light emitted from the light source 80R and the light source 80G as compared with a configuration in which the light emission efficiency of the light source 80R and the light emission efficiency of the light source 80G are significantly different from each other.

In the printing apparatus 100 according to the first aspect of the present embodiment, the light emission unit 8 may turn on the light source 80R and turn off the light source 80G when in the sleep state, in which the print unit 21 and the transport unit 23 are not running for a certain length of time or longer.

In general, the service life of the light source 80R whose material is aluminum indium gallium phosphide is longer than that of the light source 80G whose material is indium gallium nitride. For this reason, adopting the light source 80R as the light source 80 that is ON when in the sleep state makes it possible to make the difference between the service life of the light source 80R and the service life of the light source 80G less as compared with a configuration in which the light source 80G is adopted as the light source 80 that is ON when in the sleep state. That is, according to the present embodiment, as compared with a configuration in which the light source 80G is adopted as the light source 80 that is ON when in the sleep state, it is possible to reduce the possibility that the light emission unit 8 will turn into a waste and thus contribute to achieving a significant reduction in waste generation through prevention and reduction of waste generation, as set forth in Target “12.5” of SDGS.

As described above, according to the present embodiment, as compared with a configuration in which the light source 80G is adopted as the light source 80 that is ON when in the sleep state, it is possible to significantly contribute to attaining SDGs Goal 12: “Ensure sustainable consumption and production patterns”.

The printing apparatus 100 according to a second aspect of the present embodiment includes: the print unit 21 that forms an image on the printing paper PP by applying ink onto the printing paper PP; the transport unit 23 that transports the printing paper PP; and the light emission unit 8 that indicates status of either one, or both, of the print unit 21 and the transport unit 23 by using the plurality of light sources 80 including the light source 80R that emits the red light L-R, the light source 80G that emits the green light L-G, and the light source 80B that emits the blue light L-B, wherein, the light emission unit 8 is configured to perform light emission based on the red-and-green two-color light emission mode MM1 in which the light source 80R and the light source 80G are on at a same time and perform light emission based on the red-and-blue two-color light emission mode MM2 in which the light source 80R and the light source 80B are on at a same time.

Note that, in the present embodiment, the blue light L-B is an example of “light having a third wavelength”, the light source 80B is an example of “third light source”, the red-and-green two-color light emission mode MM1 is an example of “first light emission mode”, and the red-and-blue two-color light emission mode MM2 is an example of “second light emission mode”.

As described above, according to the present embodiment, the light emission unit 8 includes the plurality of light sources 80 including the light source 80R that emits the red light L-R, the light source 80G that emits the green light L-G, and the light source 80B that emits the blue light L-B. In addition, in the present embodiment, the light emission unit 8 is configured to perform light emission based on the red-and-green two-color light emission mode MM1 and perform light emission based on the red-and-blue two-color light emission mode MM2. For this reason, according to the present embodiment, as compared with a configuration in which the light emission unit 8 includes the light source 80 of a single color only, it is possible to increase the probability that a user who has color vision deficiency will be able to recognize information indicated by the light emitted by the light emission unit 8. Here is an example: when the user of the printing apparatus 100 is unable to recognize red, this user is, for example, able to recognize the color of the green light L-G as green among the color components of the light emitted in the red-and-green two-color light emission mode MM1 and able to recognize the color of the blue light L-B as blue among the color components of the light emitted in the red-and-blue two-color light emission mode MM2. Here is another example: when the user of the printing apparatus 100 is unable to recognize green, this user is, for example, able to recognize the color of the red light L-R as red among the color components of the light emitted in the red-and-green two-color light emission mode MM1 and able to recognize the red light L-R and the blue light L-B as purple among the color components of the light emitted in the red-and-blue two-color light emission mode MM2. Here is still another example: when the user of the printing apparatus 100 is unable to recognize blue, this user is, for example, able to recognize the red light L-R and the green light L-G as yellow among the color components of the light emitted in the red-and-green two-color light emission mode MM1 and able to recognize the color of the red light L-R as red among the color components of the light emitted in the red-and-blue two-color light emission mode MM2. That is, according to the present embodiment, it is possible to communicate the information indicated by the red-and-green two-color light emission mode MM1 and the information indicated by the red-and-blue two-color light emission mode MM2 as two kinds of information different from each other to the user who has color vision deficiency. Therefore, according to the present embodiment, as compared with a configuration in which the light emission unit 8 includes the light source 80 of a single color only, it is possible to suppress experiencing an inconvenience when the user who has color vision deficiency uses the printing apparatus 100. That is, according to the present embodiment, as compared with a configuration in which the light emission unit 8 includes the light source 80 of a single color only, it is possible to achieve empowerment such that no one will be left behind socially, economically, and politically, irrespective of age, gender, disability, race, ethnicity, origin, religion, or economic or other status, as set forth in Target “10.2” of SDGs.

As described above, according to the present embodiment, as compared with a configuration in which the light emission unit 8 includes the light source 80 of a single color only, it is possible to significantly contribute to attaining SDGs Goal 10: “Reduce inequality within and among countries”.

In the printing apparatus 100 according to the second aspect of the present embodiment, in the light emission unit 8, the plurality of light sources 80 is configured as a single package.

As described above, according to the present embodiment, since the plurality of light sources 80 is configured as a single package in the light emission unit 8, as compared with a configuration in which the plurality of light sources 80 is provided individually, it is possible to reduce the possibility of adhesion of dust to each of the light sources 80 and the possibility of adhesion of ink mist to each of the light sources 8. For this reason, according to the present embodiment, as compared with a configuration in which the plurality of light sources 80 is provided individually, it is possible to reduce the possibility that the light emission unit 8 will turn into a waste and thus contribute to achieving a significant reduction in waste generation through prevention and reduction of waste generation, as set forth in Target “12.5” of SDGs.

Moreover, according to the present embodiment, since the plurality of light sources 80 is configured as a single package in the light emission unit 8, at the time of disposal of the light emission unit 8, it is possible to throw away the plurality of light sources 80 provided in the light emission unit 8 together. For this reason according to the present embodiment, as compared with a configuration in which the plurality of light sources 80 is provided individually, it is possible to realize waste management at the time of disposal of the light emission unit 8 and thus contribute to achieving a significant reduction in release of chemicals, etc. contained in the waste to air, water, and soil, as set forth in Target "12.4" of SDGs.

As described above, according to the present embodiment, as compared with a configuration in which the plurality of light sources 80 is provided individually, it is possible to significantly contribute to attaining SDGs Goal 12: "Ensure sustainable consumption and production patterns".

Moreover, according to the present embodiment, since the plurality of light sources 80 is configured as a single package in the light emission unit 8, as compared with a configuration in which the plurality of light sources 80 is provided individually, it is possible to make the work of attaching and detaching the light emission unit 8 easier in the processes of manufacturing and disposal of the light emission unit 8. Therefore, according to the present embodiment, as compared with a configuration in which the plurality of light sources 80 is provided individually, it is possible to lower the barrier for physically challenged people and elderly people to participate in work for manufacturing and disposal of the light emission unit 8 and thus increase the possibility of creating new jobs for physically challenged people and elderly people. That is, according to the present embodiment, as compared with a configuration in which the plurality of light sources 80 is provided individually, it is possible to achieve empowerment such that no one will be left behind socially, economically, and politically, irrespective of age, gender, disability, race, ethnicity, origin, religion, or economic or other status, as set forth in Target "10.2" of SDGs.

As described above, according to the present embodiment, as compared with a configuration in which the plurality of light sources 80 is provided individually, it is possible to significantly contribute to attaining SDGs Goal 10: "Reduce inequality within and among countries".

In the printing apparatus 100 according to the second aspect of the present embodiment, when the print unit 21 and the transport unit 23 are in a sleep state, the light emission unit 8 performs light emission based on the red light emission mode MN1 in which the light source 80R is on and the plurality of light sources 80 of the light emission unit 8, except for the light source 80R, is off, and performs light emission based on the green light emission mode MN2 in which the light source 80G is on and the plurality of light sources 80 of the light emission unit 8, except for the light source 80G, is off.

Note that, in the present embodiment, the sleep state is an example of "particular state", the red light emission mode MN1 is an example of "third light emission mode", and the green light emission mode MN2 is an example of "fourth light emission mode".

As described above, according to the present embodiment, since the light emission unit 8 performs light emission based on the mono-color light emission mode MN when in the sleep state, it is possible to make the service life of the light emission unit 8 longer as compared with a configuration in which the light emission unit 8 performs light emission based on the multi-color light emission mode MM when in the sleep state. That is, according to the present embodiment, as compared with a configuration in which the light emission unit 8 performs light emission based on the multi-color light emission mode MM when in the sleep state, it is possible to reduce the possibility that the light emission unit 8 will turn into a waste and thus contribute to achieving a significant reduction in waste generation through prevention and reduction of waste generation, as set forth in Target "12.5" of SDGs.

As described above, according to the present embodiment, as compared with a configuration in which the light emission unit 8 performs light emission based on the multi-color light emission mode MM when in the sleep state, it is possible to significantly contribute to attaining SDGs Goal 12: "Ensure sustainable consumption and production patterns".

Though the sleep state is taken as an example of "particular state" in the present embodiment, the scope of the present disclosure is not limited to this exemplary configuration. "Particular state" may be, for example, a normal state in which no error has occurred on the printing apparatus 100.

The printing apparatus 100 according to the second aspect of the present embodiment further includes the light guide 91 in which the light guiding path 912 is provided, and light emitted by each of the plurality of light sources 80 of the light emission unit 8 goes out through the light guiding path 912 provided in the light guide 91.

For this reason, according to the present embodiment, as compared with a configuration in which the printing apparatus 100 does not include the light guide 91, it is possible to reduce the possibility of adhesion of dust and ink mist to each of the light sources 80 and thus make the service life of the light emission unit 8 longer. That is, according to the present embodiment, as compared with a configuration in which the printing apparatus 100 does not include the light guide 91, it is possible to reduce the possibility that the light emission unit 8 will turn into a waste and thus contribute to achieving a significant reduction in waste generation through prevention and reduction of waste generation, as set forth in Target "12.5" of SDGs.

As described above, according to the present embodiment, as compared with a configuration in which the printing apparatus 100 does not include the light guide 91, it is possible to significantly contribute to attaining SDGs Goal 12: "Ensure sustainable consumption and production patterns".

In the printing apparatus 100 according to the second aspect of the present embodiment, the light emission unit 8 is configured to perform light emission based on the long-cycle blinking mode MT1 in which the target light source 80 from which light is emitted among the plurality of light sources 80 of the light emission unit 8 is caused to blink in a long cycle and perform light emission based on the short-cycle blinking mode MT2 in which the target light source 80 from which light is emitted among the plurality of light sources 80 of the light emission unit 8 is caused to blink in a short cycle.

Note that, in the present embodiment, blinking in a long cycle is an example of "first lighting pattern", blinking in a short cycle is an example of "second lighting pattern", the long-cycle blinking mode MT1 is an example of "first lighting mode", and the short-cycle blinking mode MT2 is an example of "second lighting mode".

As described above, in the present embodiment, the light emission unit 8 is configured to perform light emission based on the long-cycle blinking mode MT1 and perform light emission based on the short-cycle blinking mode MT2. For this reason, according to the present embodiment, as compared with a configuration in which the light emission unit 8 is configured to perform light emission based on a single lighting pattern only, it is possible to increase the probability that a user who has color vision deficiency will be able to recognize information indicated by the light emitted by the light emission unit 8. Specifically, according to the present embodiment, it is possible to communicate the information indicated by the long-cycle blinking mode MT1 and the information indicated by the short-cycle blinking mode MT2 as two kinds of information different from each other to the user who has color vision deficiency. Therefore, according to the present embodiment, as compared with a configuration in which the light emission unit 8 is configured to perform light emission based on a single lighting pattern only, it is possible to suppress experiencing an inconvenience when the user who has color vision deficiency uses the printing apparatus 100. That is, according to the present embodiment, as compared with a configuration in which the light emission unit 8 is configured to perform light emission based on a single lighting pattern only, it is possible to achieve empowerment such that no one will be left behind socially, economically, and politically, irrespective of age, gender, disability, race, ethnicity, origin, religion, or economic or other status, as set forth in Target "10.2" of SDGs.

As described above, according to the present embodiment, as compared with a configuration in which the light emission unit 8 is configured to perform light emission based on a single lighting pattern only, it is possible to significantly contribute to attaining SDGs Goal 10: "Reduce inequality within and among countries".

The printing apparatus 100 according to the second aspect of the present embodiment further includes the touch panel 7 used for inputting information about settings of operation of the light emission unit 8, and the touch panel 7 is disposed in proximity to the light emission unit 8.

Note that, in the present embodiment, the print unit 7 is an example of "operation unit".

As described above, in the present embodiment, the user is able to input information about settings of operation of the light emission unit 8 via the touch panel 7. For this reason, according to the present embodiment, as compared with a configuration in which the settings of operation of the light emission unit 8 are not changeable, it is possible to increase the probability that a user who has color vision deficiency will be able to recognize information indicated by the light emitted by the light emission unit 8. Therefore, according to the present embodiment, as compared with a configuration in which the settings of operation of the light emission unit 8 are not changeable, it is possible to suppress experiencing an inconvenience when the user who has color vision deficiency uses the printing apparatus 100. That is, according to the present embodiment, as compared with a configuration in which the settings of operation of the light emission unit 8 are not changeable, it is possible to achieve empowerment such that no one will be left behind socially, economically, and politically, irrespective of age, gender, disability, race, ethnicity, origin, religion, or economic or other status, as set forth in Target "10.2" of SDGs.

As described above, according to the present embodiment, as compared with a configuration in which the settings of operation of the light emission unit 8 are not changeable, it is possible to significantly contribute to attaining SDGs Goal 10: "Reduce inequality within and among countries".

B. Variation Examples

The exemplary embodiment described above can be modified in various ways. Some specific examples of modification are described below. Any two or more variation examples selected from among the examples described below may be combined as long as they are not contradictory to each other or one another. In each variation example described below, the same reference numerals as those used in the description and illustration of the foregoing embodiment will be assigned to elements that are equivalent to those in the foregoing embodiment in terms of operation and/or function, and a detailed explanation of them is omitted.

B.1. First Variation Example

In the foregoing embodiment, a case where the light emission unit 8 includes three light sources 80 has been taken as an example. However, the scope of the present disclosure is not limited to this exemplary configuration. It is sufficient as long as the light emission unit 8 includes two or more light sources 80. The light emission unit 8 may include four or more light sources 80.

When the light emission unit 8 includes two light sources 80, the light emission unit 8 may be configured to operate in a plurality of operation modes MD including the normal operation mode MD1 and the energy-saving operation mode MD2. When the light emission unit 8 includes two light sources 80, the light emission unit 8 may be configured to emit light in three light emission modes ML including one multi-color light emission mode MM and two mono-color light emission modes MN. When the light emission unit 8 includes two light sources 80, the light emission unit 8 may be configured to operate in a plurality of lighting modes MT including the long-cycle blinking mode MT1, the short-cycle blinking mode MT2, and the always-light-ON mode MT3.

B.2. Second Variation Example

In the foregoing embodiment and the first variation example described above, a case where the display device 3 is mounted in the printing apparatus 100 has been taken as an example. However, the scope of the present disclosure is not limited to this exemplary configuration. The display device 3 can be used alone. The display device 3 can be applied to electronic equipment such as a camera, a projector, a smartphone, and the like.

Figure 11:
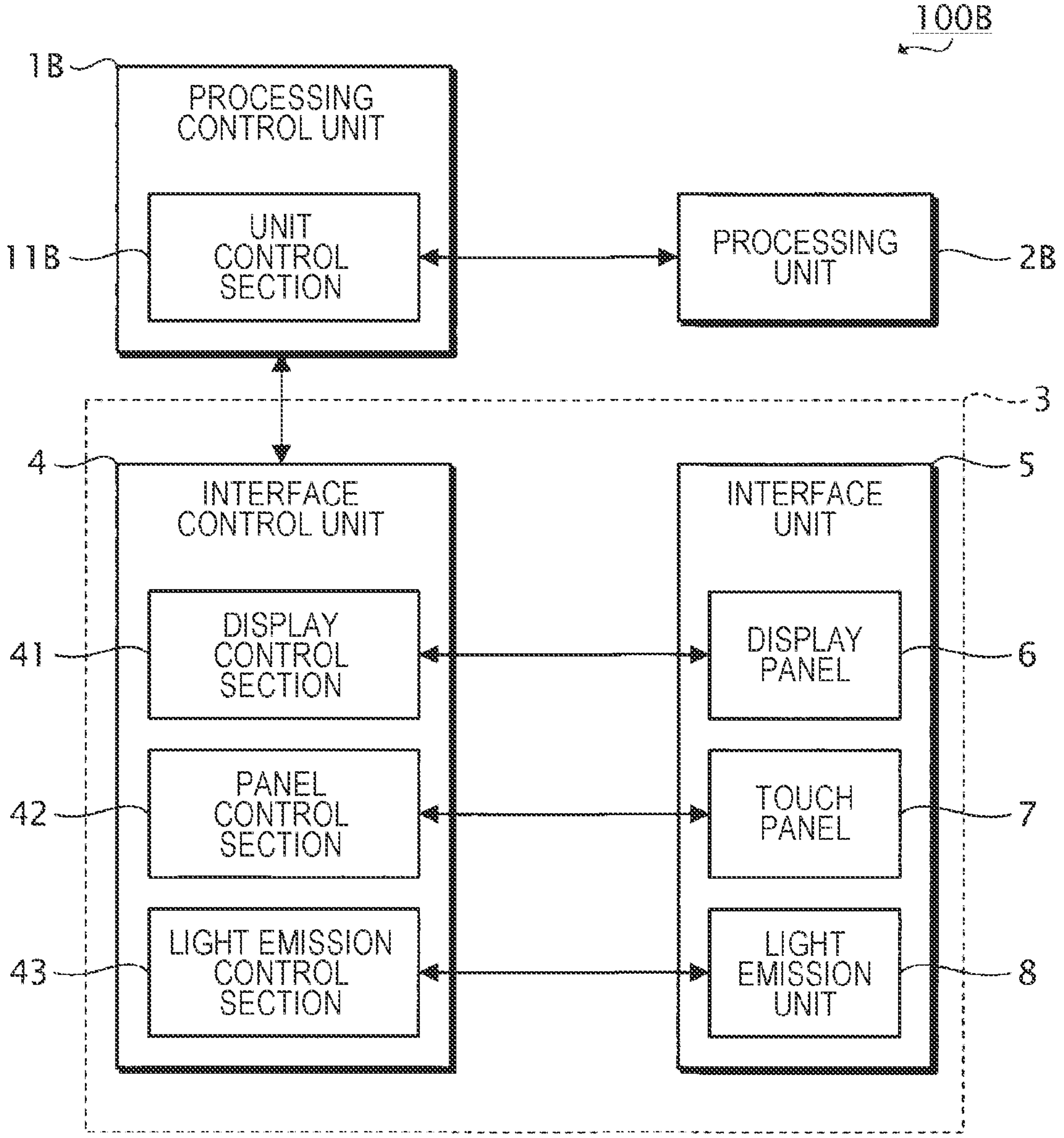
FIG. 11 is a block diagram illustrating an example of a configuration of electronic equipment according to a second variation example of the present disclosure.

FIG. 11 is a functional block diagram illustrating an example of a functional configuration of electronic equipment 100B according to this variation example.

As illustrated in FIG. 11, the electronic equipment 100B includes a processing unit 2B that performs various kinds of processing, a processing control unit 1B that controls the processing unit 2B, and the display device 3.

The processing unit 2B mentioned here is, for example, an imaging unit that performs imaging processing of picking up an image of a target object when the electronic equipment 100B is a camera, a projection unit that performs projection processing of projecting a desired image when the electronic equipment 100B is a projector, or a communication unit that performs communication processing of communicating with external equipment when the electronic equipment 100B is a smartphone.

Also in this variation example, the plurality of light sources 80 provided in the light emission unit 8 of the display device 3 is configured as a single package. Therefore, according to this variation example, as compared with a configuration in which the plurality of light sources 80 is provided individually in the display device 3, it is possible to reduce the possibility of adhesion of dust to each of the light sources 80. For this reason, according to this variation example, as compared with a configuration in which the plurality of light sources 80 is provided individually in the display device 3, it is possible to significantly contribute to attaining SDGs Goal 12: "Ensure sustainable consumption and production patterns", attaining SDGs Goal 3: "Ensure healthy lives and promote well-being for all at all ages", attaining SDGs Goal 11: "Make cities and human settlements inclusive, safe, resilient and sustainable", and attaining SDGs Goal 10: "Reduce inequality within and among countries".

Moreover, also in this variation example, the light emission unit 8 is configured to perform light emission based on the red-and-green two-color light emission mode MM1 in which the light source 80R and the light source 80G are on at a same time and perform light emission based on the red-and-blue two-color light emission mode MM2 in which the light source 80R and the light source 80B are on at a same time. Therefore, according to this variation example, as compared with a configuration in which the light emission unit 8 includes the light source 80 of a single color only, it is possible to increase the probability that a user who has color vision deficiency will be able to recognize information indicated by the light emitted by the light emission unit 8. For this reason, according to this variation example, as compared with a configuration in which the light emission unit 8 includes the light source 80 of a single color only, it is possible to significantly contribute to attaining SDGs Goal 10: "Reduce inequality within and among countries".

What is claimed is:

1. An image forming apparatus comprising:

an image forming unit that forms an image on a medium by applying a colorant onto the medium;

a transport unit that transports the medium;

a light emission unit that indicates status of either one, or both, of the image forming unit and the transport unit by using a plurality of light sources including a first light source that emits light having a first wavelength, a second light source that emits light having a second wavelength, and a third light source that emits light having a third wavelength; and a light emission control section that controls the light emission unit, the light emission unit being configured to, under control of the light emission control section, perform light emission based on a first light emission mode in which the first light source and the second light source are on at a same time, perform light emission based on a second light emission mode in which the first light source and the third light source are on at a same time, perform light emission based on a third light emission mode in which the first light source is on and the plurality of light sources, except for the first light source, is off, and perform light emission based on a fourth light emission mode in which the second light source is on and the plurality of light sources, except for the second light source, is off, after determining that the image forming unit and the transport unit are in a no-error condition in which no error occurs on the image forming unit and the transport unit, and before determining the no-error condition ends, the light emission control section causes the light emission unit to perform the light emission based on the third light emission mode and to perform the light emission based on the fourth light emission mode after the third light emission mode.

2. The image forming apparatus according to claim 1, wherein in the light emission unit, the plurality of light sources is configured as a single package.

3. The image forming apparatus according to claim 1, further comprising:

a light guide in which a light guiding path is provided, wherein light emitted by each of the plurality of light sources of the light emission unit goes out through the light guiding path provided in the light guide.

4. The image forming apparatus according to claim 1, wherein the light emission unit is configured to perform light emission based on a first lighting mode in which a target light source from which light is emitted among the plurality of light sources is caused to change between on and off in a first lighting pattern and perform light emission based on a second lighting mode in which the target light source is caused to change between on and off in a second lighting pattern.

5. The image forming apparatus according to claim 1, further comprising:

an operation unit used for inputting information about settings of operation of the light emission unit, wherein the operation unit is disposed in proximity to the light emission unit.

6. Electronic equipment comprising:

a processing unit that performs predetermined processing; and a light emission unit that indicates status of the processing unit by using a plurality of light sources including a first light source that emits light having a first wavelength, a second light source that emits light having a second wavelength, and a third light source that emits light having a third wavelength; and a light emission control section that controls the light emission unit, the light emission unit being configured to, under control of the light emission control section, perform light emission based on a first light emission mode in which the first light source and the second light source are on at a same time, perform light emission based on a second light emission mode in which the first light source and the third light source are on at a same time perform light emission based on a third light emission mode in which the first light source is on and the plurality of light sources, except for the first light source, is off, and perform light emission based on a fourth light emission mode in which the second light source is on and the plurality of light sources, except for the second light source, is off, after determining that the processing unit is in a no-error condition in which no error occurs on the processing unit, and before determining the no-error condition ends, the light emission control section causes the light emission unit to perform the light emission based on the third light emission mode and to perform the light emission based on the fourth light emission mode after the third light emission mode.

7. The electronic equipment according to claim 6, wherein in the light emission unit, the plurality of light sources is configured as a single package.

8. The electronic equipment according to claim 6, further comprising:

a light guide in which a light guiding path is provided, wherein light emitted by each of the plurality of light sources of the light emission unit goes out through the light guiding path provided in the light guide.

9. The electronic equipment according to claim 6, wherein the light emission unit is configured to perform light emission based on a first lighting mode in which a target light source from which light is emitted among the plurality of light sources is caused to change between on and off in a first lighting pattern and perform light emission based on a second lighting mode in which the target light source is caused to change between on and off in a second lighting pattern.

10. The electronic equipment according to claim 6, further comprising:

an operation unit used for inputting information about settings of operation of the light emission unit, wherein the operation unit is disposed in proximity to the light emission unit.

* * * * *